(12) United States Patent
Usuki et al.

(10) Patent No.: US 9,387,772 B2
(45) Date of Patent: Jul. 12, 2016

(54) CHARGING SYSTEM, SERVER DEVICE, AND PROGRAM FOR SERVER DEVICE

(71) Applicant: Panasonic Corporation, Kadoma-shi, Osaka (JP)

(72) Inventors: Izumi Usuki, Osaka (JP); Takeshi Ogawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 147 days.

(21) Appl. No.: 14/203,618

(22) Filed: Mar. 11, 2014

(65) Prior Publication Data

US 2014/0191722 A1 Jul. 10, 2014

Related U.S. Application Data

(63) Continuation of application No. PCT/JP2012/005975, filed on Sep. 20, 2012.

(30) Foreign Application Priority Data

Sep. 20, 2011 (JP) .................................. 2011-204900

(51) Int. Cl.
*H02J 7/00* (2006.01)
*B60L 11/18* (2006.01)
(Continued)

(52) U.S. Cl.
CPC ......... *B60L 11/1844* (2013.01); *B60L 11/1824* (2013.01); *G06Q 10/04* (2013.01); *H01M 10/44* (2013.01); *H01M 10/48* (2013.01); *H02J 7/0027* (2013.01); *B60L 2230/16* (2013.01); *B60L 2230/40* (2013.01); *B60L 2240/622* (2013.01);

(Continued)

(58) Field of Classification Search
CPC .................................................... B60L 11/1844
USPC ............................................................ 320/109
See application file for complete search history.

(56) References Cited

U.S. PATENT DOCUMENTS 7,679,336 B2   3/2010   Gale et al.
2001/0051876 A1*  12/2001   Seigel ................. G06F 17/3087
                                                              705/26.1

(Continued)

FOREIGN PATENT DOCUMENTS

CN        101257218 A      9/2008
EP        2456036 A1       5/2012

(Continued)

OTHER PUBLICATIONS

European search report dated Jan. 7, 2015 issued for the corresponding European patent application.

(Continued)

*Primary Examiner* — M'baye Diao
(74) *Attorney, Agent, or Firm* — Mots Law, PLLC (57) ABSTRACT

A charging system includes central server capable of communicating with electric vehicles, and charging stations. Central server receives travel information on the electric vehicles and remaining charge information on rechargeable batteries from the electric vehicles, forecasts demanded power in a predetermined area, and issues a charge schedule change request to charge control devices included in the predetermined area. Charging stations change charge schedules for the rechargeable batteries mounted on the electric vehicles in accordance with the charge schedule change request.

9 Claims, 3 Drawing Sheets

(51) Int. Cl.
  *H01M 10/44* (2006.01)
  *H01M 10/48* (2006.01)
  *G06Q 10/04* (2012.01)
  *H02J 3/00* (2006.01)
(52) U.S. Cl.
  CPC .......... *B60L 2240/70* (2013.01); *B60L 2240/80* (2013.01); *B60L 2250/10* (2013.01); *B60L 2250/14* (2013.01); *B60L 2260/46* (2013.01); *H01M 2220/20* (2013.01); *H02J 2003/003* (2013.01); *Y02E 60/721* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y04S 10/126* (2013.01); *Y04S 10/54* (2013.01)

(56) References Cited

U.S. PATENT DOCUMENTS

2006/0059023 A1* 3/2006 Mashinsky ............. G06Q 10/02
    705/5
2009/0062967 A1  3/2009 Kressner et al.

FOREIGN PATENT DOCUMENTS

JP    2009-171823 A    7/2009
WO    2011/007573 A1    1/2011

OTHER PUBLICATIONS

The Chinese Search Report issued on Mar. 2, 2016 in the counterpart Chinese patent application.

* cited by examiner

CHARGING SYSTEM, SERVER DEVICE, AND PROGRAM FOR SERVER DEVICE

CROSS REFERENCE TO RELATED APPLICATIONS

This application is a continuation application of International Application No. PCT/JP2012/005975, filed on Sep. 20, 2012, entitled "CHARGING SYSTEM, SERVER DEVICE, AND PROGRAM FOR SERVER DEVICE", which claims priority based on Article 8 of Patent Cooperation Treaty from prior Japanese Patent Application No. 2011-204900, filed on Sep. 20, 2011, the entire contents of which are incorporated herein by reference.

TECHNICAL FIELD

The invention relates to a charging system, a server device, and a program for the server device for managing an operation of charging an electric vehicle.

BACKGROUND ART

As a charging system for efficiently charging an electric vehicle, the following Patent Literature 1 and the like are known.

A residential electric power control device disclosed in Patent Literature 1 receives information on charging of an on-board battery sent from an electric vehicle before the electric vehicle arrives at a place for charging the electric vehicle with electric power. This electric power control device sets the start time of charging of the on-board battery or the like based on the charging information so that the charging of the on-board battery or the like may be completed by a predetermined time.

The above technique described in Patent Literature 1 suppresses a peak power consumption in a home. Accordingly, this technique described in Patent Literature 1 does not suppress a power demand in each of areas managed by an electric power company.

Accordingly, the invention is proposed in view of the above-described circumstances, and an object of an embodiments of the invention is to provide a charging system, a server device, and a program for the server device, which can manage electric power in each predetermined area.

CITATION LIST

Patent Literature

Patent Literature 1: International Patent Application Publication No. WO2011/007573

SUMMARY OF THE INVENTION

A charging system according to a first aspect of the invention is a charging system including: a server device capable of communicating with an electric vehicle driven by electric power stored in a rechargeable battery; and a charge control device capable of communicating with the server device and configured to control charging of the rechargeable battery. The server device includes: a communication unit configured to receive travel information on the electric vehicle and remaining charge information on the rechargeable battery of the electric vehicle from the electric vehicle; a demand forecast unit configured to forecast demanded power in a predetermined area based on the travel information and the remaining charge information received by the communication unit; and a schedule management unit configured to issue a charge schedule change request to the charge control device included in the predetermined area based on the demanded power in the predetermined area forecasted by the demand forecast unit. The charge control device changes a charge schedule for the rechargeable battery mounted on the electric vehicle in accordance with the charge schedule change request issued by the server device.

A charging system according to a second aspect of the invention is the charging system of the above-described first aspect having the following features: the schedule management unit obtains a power consumption in the predetermined area, and compares the obtained power consumption and the demanded power in the predetermined area forecasted by the demand forecast unit to calculate a degree of match; in a case where the degree of match calculated by the schedule management unit is lower than a predetermined value, the demand forecast unit re-forecasts demanded power in the predetermined area based on the travel information and the remaining charge information; and the schedule management unit issues a charge schedule change request to the charge control device included in the predetermined area based on the demanded power as a re-forecast result of the demand forecast unit.

A charging system according to a third aspect of the invention is the charging system of the above-described second aspect having the following feature: the schedule management unit learns a process of generating the charge schedule change request for the predetermined area based on the degree of match.

A server device according to a fourth aspect of the invention is a server device capable of communicating with an electric vehicle driven by electric power stored in a rechargeable battery and a charge control device configured to control charging of the rechargeable battery mounted on the electric vehicle, the server device including: a communication unit configured to receive travel information on the electric vehicle and remaining charge information on the rechargeable battery of the electric vehicle from the electric vehicle; a demand forecast unit configured to forecast demanded power in a predetermined area based on the travel information and the remaining charge information received by the communication unit; and a schedule management unit configured to issue a charge schedule change request to the charge control device included in the predetermined area based on the demanded power in the predetermined area forecasted by the demand forecast unit.

A program for a server device according to a fifth aspect of the invention is a program for a server device capable of communicating with an electric vehicle driven by electric power stored in a rechargeable battery and a charge control device configured to control charging of the rechargeable battery mounted on the electric vehicle, the program causing a computer of the server device to function as: a communication unit configured to receive travel information on the electric vehicle and remaining charge information on the rechargeable battery of the electric vehicle from the electric vehicle; a demand forecast unit configured to forecast demanded power in a predetermined area including a destination contained in the travel information based on the travel information and the remaining charge information received by the communication unit; and a schedule management unit configured to issue a charge schedule change request to the charge control device included in the predetermined area based on the demanded power in the predetermined area forecasted by the demand forecast unit. The program may be stored in a DVD or other type of non-transitory computer readable medium.

DETAILED DESCRIPTION

Hereinafter, embodiments of the invention are described with reference to the drawings.

Figure 1:
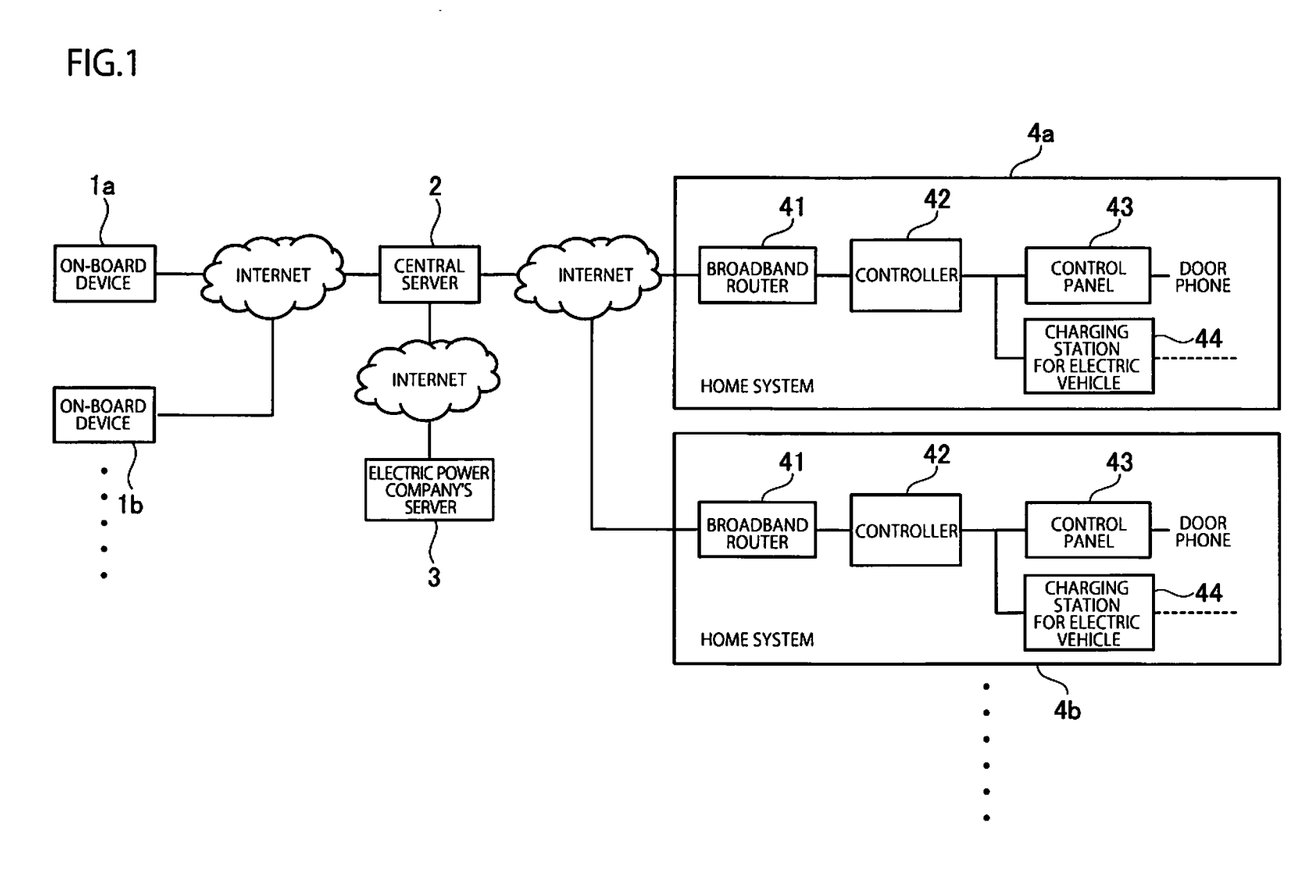
FIG. 1 is a block diagram of a charging system illustrated as an embodiment of the invention.

A charging system described as an embodiment of the invention is configured, for example, as illustrated in FIG. 1. This charging system manages charging of electric vehicles (electric cars) with electric power. In this charging system, an electric vehicle includes a rechargeable battery, a charging device configured to charge the rechargeable battery, a power conversion device configured to convert electric power stored in the rechargeable battery into mechanical power, and the like. The electric vehicle travels by operating a drive mechanism with the mechanical power.

The charging system includes on-board devices $1a, 1b, \ldots, 1n$, central server 2 as a server device, electric power company's. server 3, and home systems $4a, 4b, \ldots, 4n$ Hereinafter, when an on-board device is generically mentioned, the on-board device is simply referred to as "on-board device 1". Further, when a home system is generically mentioned, the home system is simply referred to as "home system 4". Each user is assumed to use an electric vehicle and go home. For example, user A owns on-board device $1a$ and home system $4a$, and user B owns on-board device $1b$ and home system $4b$.

In the charging system, home system 4 is provided in each home. Home system 4 belongs to a predetermined power management area managed by an electric power company. This predetermined power management area is an area in which the electric power company manages an upper limit for power demand. As described later, home system 4 is required to adjust power consumption in accordance with a power demand in the power management area covering home system 4 itself so that the power consumption may not exceed the upper limit for the power management area covering home system 4 itself.

Home system 4 can communicate with central server 2. Moreover, home system 4 can communicate with on-board device 1 through central server 2. Home system 4 performs the operation of monitoring power usage status in the home and the operation of controlling the power usage status.

Home system 4 includes broadband router 41, controller 42, control panel 43, and charging station 44 for an electric car.

Broadband router 41 communicates with central server 2.

Control panel 43 is configured as, for example, a touch panel or the like. Control panel 43 includes a display interface configured to display various kinds of information to the user and an operation interface configured to receive a user's operation. This control panel 43 is connected to a door phone or the like and is capable of displaying various kinds of information and allowing various operations.

In particular, the control panel 43 displays a so-called "coming-home notice" received from central server 2 through on-board device 1. This coming-home notice contains travel information and remaining charge information sent from the electric vehicle on which on-board device 1 is mounted, and indicates that the user is coming home by the electric vehicle in a subsequent time period. Moreover, control panel 43 displays a request to change a charge schedule for charging station 44 sent from central server 2.

Controller 42 controls the operations of control panel 43 and charging station 44. Controller 42 causes the display interface of control panel 43 to display various kinds of information. Moreover, controller 42 controls various electric appliances in the home in accordance with operation instructions from the operation interface of control panel 43.

In particular, controller 42 causes control panel 43 to display a request to change a charge schedule for charging station 44 in response to a request from central server 2. After that, controller 42 changes the charge schedule for charging station 44 in response to an operation for accepting the request to change the charge schedule for charging station 44.

The above-described controller 42 can communicate with central server 2 as a server device through broadband router 41 or the like. Charging station 44 functions as a charge control device configured to control charging of the rechargeable battery mounted on the electric vehicle.

When the rechargeable battery mounted on the electric vehicle is charged, the electric vehicle on which on-board device 1 is mounted is connected to charging station 44. Charging station 44 starts the charging of the electric vehicle according to a preset charge schedule or a user's operation. Charging station 44 charges the electric vehicle according to a control signal provided from controller 42 or a user's operation performed on an unillustrated operation interface.

In particular, charging station 44 sets a charge schedule for the electric vehicle in accordance with a control signal provided from controller 42. This charge schedule contains, for example, charge start time, full capacity, charge rate, charge duration, charge finish time, and the like. In the case where a charge schedule is set, charging station 44 automatically charges the electric vehicle in accordance with the charge schedule.

Moreover, charging station 44 changes the charge schedule in accordance with a control signal provided from controller 42. Specifically, controller 42 provides a charge schedule change request so as to lower a peak power demand in the predetermined power management area. In response to the charge schedule change request, charging station 44 changes charge start time, full capacity, charge rate, charge duration, charge finish time, and the like.

Figure 2:
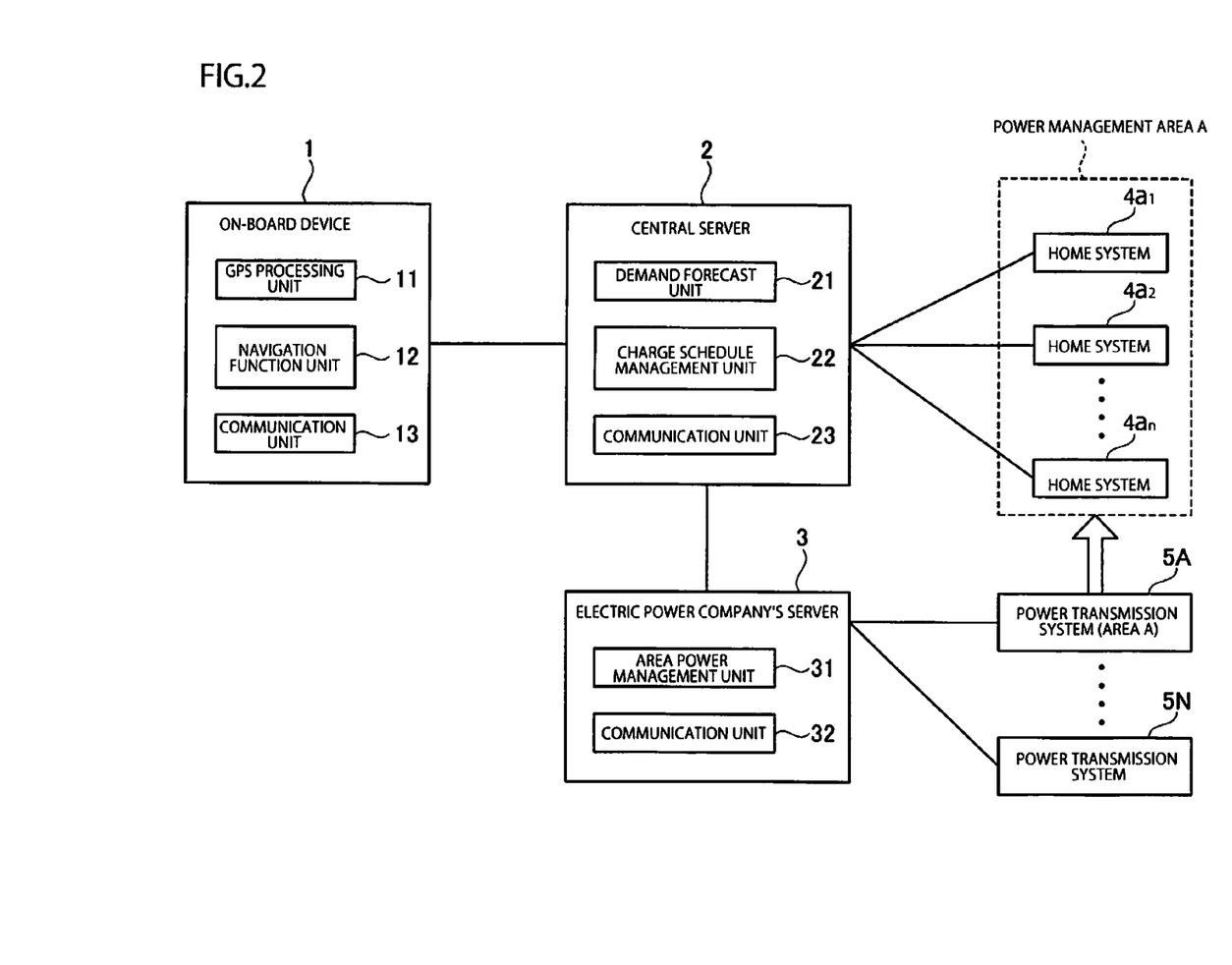
FIG. 2 is another block diagram of the charging system illustrated as an embodiment of the invention.

As shown in FIG. 2, on-board device 1 includes GPS processing unit 11, navigation function unit 12, and communication unit 13.

Communication unit 13 includes a wireless communication circuit and the like, and wirelessly communicates with central server 2 via the Internet. Communication unit 13 sends to central server 2 a coming-home notice containing travel information on the electric vehicle and remaining charge information on the rechargeable battery of the electric vehicle. The travel information on the electric vehicle contains driving status indicating a traveling or stopping state, a destination, and the like.

GPS processing unit 11 communicates with a GPS satellite to obtain the current position of the electric vehicle.

Based on the current position obtained by GPS processing unit 11, map data, a set destination, and the like, navigation function unit 12 computes a recommended route from the current position to the destination. Navigation function unit 12 performs a display operation and a voice output operation to guide the direction of travel of the electric vehicle in accordance with the computed recommended route and the current position.

Navigation function unit 12 receives an operation by the user of the electric vehicle and sends a coming-home notice. In this process, navigation function unit 12 generates travel information containing the user's home as the destination of the electric vehicle and the remaining charge information on the rechargeable battery of the electric vehicle. Moreover, navigation function unit 12 may incorporate the current position of the electric vehicle, the distance from the current position to the user's home, and estimated time of arrival at home into the coming-home notice.

It should be noted that of course, the way of sending the travel information and the remaining charge information from the electric vehicle to central server 2 is not limited to using navigation function unit 12, and communication means such as a mobile phone, a personal computer, or the like may be used.

Electric power company's server 3 can communicate with central server 2 via the Internet. The operation of electric power company's server 3 is controlled by the electric power company, which supplies electric power to home system 4. Electric power company's server 3 includes area power management unit 31 and communication unit 32.

Communication unit 32 communicates with central server 2 via the Internet.

Area power management unit 31 obtains an upper power limit for the predetermined power management area. Further, area power management unit 31 may obtain an upper limit for power available to the electric vehicle, of available power in the predetermined power management area. Electric power company's server 3 is connected to, for example, power transmission systems 5A, . . . , 5N which transmit power to respective power management areas. For example, power transmission system 5A supplies power to home systems $4a_1$, $4a_2$, . . . , $4a_n$ in homes included in power management area A. Electric power company's server 3 obtains from each power transmission system 5 the power supplied to the corresponding power management area. Area power management unit 31 provides an upper power limit for the power management area to central server 2, which communicates with home systems 4 included in the predetermined power management area. Area power management unit sends an upper power limit for the corresponding power management area to central server 2 at time intervals of a predetermined length, for example, every hour, every 30 minutes, or the like (e.g., periodically).

Central server 2 includes demand forecast unit 21, charge schedule management unit 22, and communication unit 23. Central server 2 is a computer including a storage unit, a communication I/F circuit, a CPU, and a program, and the CPU executes the program. Thus, the program on central server 2 causes central server 2 to execute a procedure for issuing a charge schedule change request as described later.

Communication unit 23 communicates with on-board device 1, electric power company's server 3, and home system 4. Communication unit 23 receives the travel information as the coming-home notice sent from on-board device 1. Thus, central server 2 obtains the travel information on the electric vehicle and the remaining charge information on the rechargeable battery of the electric vehicle. Communication unit 23 obtains an upper power limit notice for each power management area from electric power company's server 3.

Based on the travel information containing the travel information on the electric vehicle and the remaining charge information on the rechargeable battery of the electric vehicle, demand forecast unit 21 forecasts demanded power in a predetermined power management area including a destination contained in the travel information. Demand forecast unit 21 collects travel information from on-board devices 1 for each power management area, and estimates a time slot in which the rechargeable batteries of the electric vehicles are charged in the power management area. Demand forecast unit 21 forecasts demanded power for each power management area at time intervals of a predetermined length, for example, every hour (e.g. periodically).

Based on the demanded power in each power management area forecasted by demand forecast unit 21, charge schedule management unit 22 issues a charge schedule change request to charging stations 44 included in the power management area. In this process, charge schedule management unit 22 compares for each power management area the upper power limit notice sent from electric power company's server 3 and the demanded power forecasted by demand forecast unit 21. Based on a result of the comparison between the upper power limit notice and the forecasted power demand, charge schedule management unit 22 generates a charge schedule change request. For example, in the case where the demanded power forecasted reaches 80% of the upper power limit, charge schedule management unit 22 generates a charge schedule change request to refrain from charging the electric vehicles in the time slot. Upon the generation of a charge schedule change request, charge schedule management unit 22 sends the charge schedule change request to each home system 4.

Upon the receipt of the charge schedule change request, each home system 4 causes charging station 44 to change a charge schedule for the rechargeable battery mounted on the electric vehicle in accordance with the charge schedule change request. In this process, home system 4 causes controller 42 to display the charge schedule change request on control panel 43. When controller 42 detects an operation for accepting the change request performed on control panel 43, controller 42 sends the charge schedule change request to charging station 44. In response to this request, charging station 44 changes, for example, charge start time, charge rate, charge duration, and the like.

It should be noted that though in this embodiment, central server 2 performs demand forecasting and charge schedule management, these processings may be performed by electric power company's server 3 or any other server.

Next, the operation of the charging system configured as described above is described with reference to FIG. 3.

Figure 3:
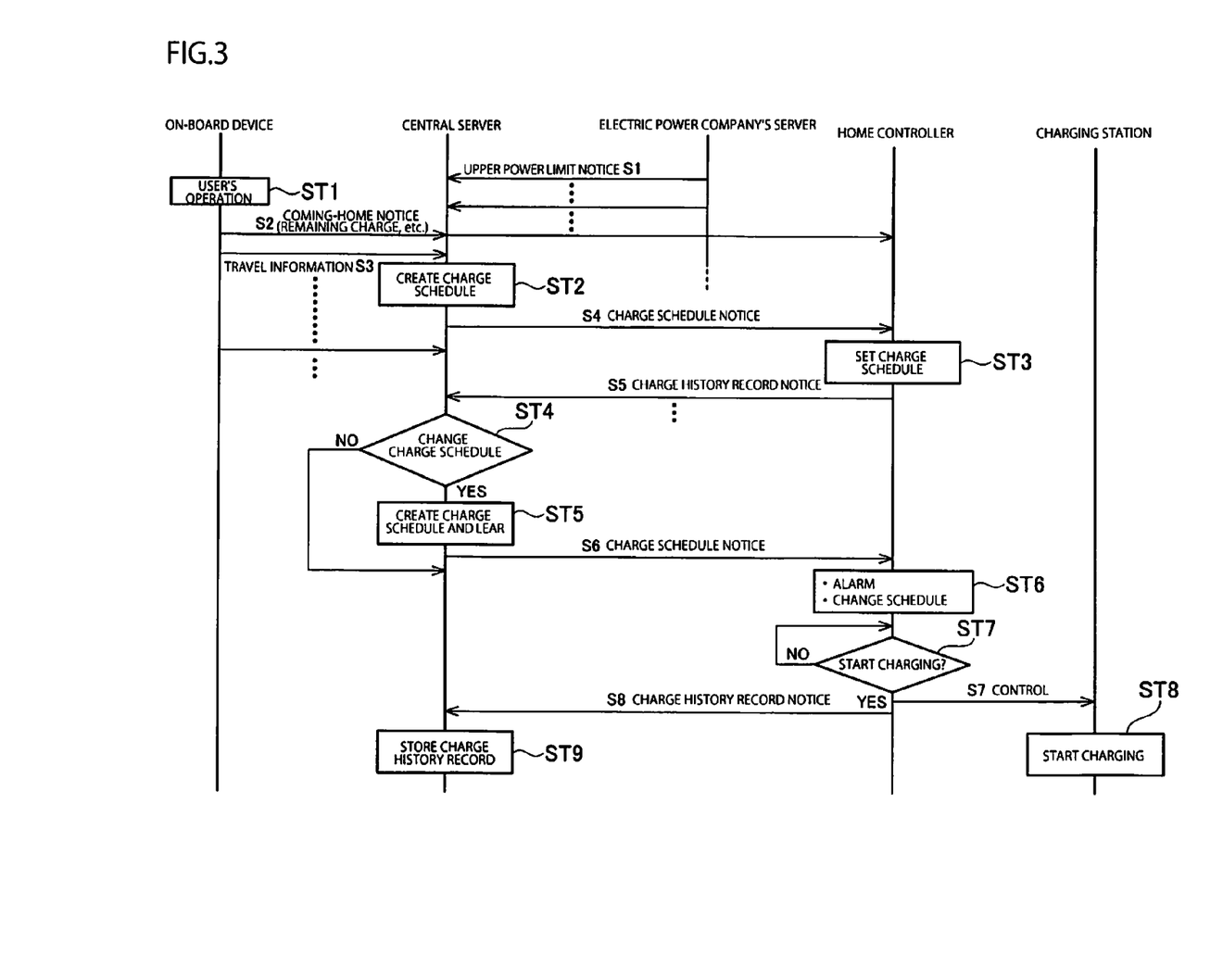
FIG. 3 is a sequence diagram illustrating the operation of the charging system illustrated as an embodiment of the invention.

In this charging system, electric power company's server 3 provides central server 2 with upper power limit notice S1 for each of power management areas including home systems 4 with which central server 2 can communicate. Electric power company's server 3 sends this upper power limit notice S1 to central server 2 at time intervals of a predetermined length.

When a user operates on-board device 1 in heading home (step ST1), on-board device 1 sends coming-home notice S2 to central server 2. This coming-home notice S2 contains travel information, remaining charge information on the rechargeable battery, and the like. After that, on-board device 1 sends travel information S3 in accordance with the travel of the electric vehicle or at time intervals of a predetermined length.

Upon the receipt of coming-home notice S2, central server 2 sends this coming-home notice S2 to home system 4 corresponding to the electric vehicle. In this process, central server 2 sends coming-home notice S2 to an address of home system 4 registered in advance in association with ID information contained in coming-home notice S2.

Upon the receipt of coming-home notice S2, home system 4 causes control panel 43 to display the position of the electric vehicle, estimated time of arrival at home, and the like.

Based on coming-home notice S2 and travel information S3 sent after this coming-home notice S2, central server 2 creates a charge schedule for charging station 44 for each home system 4. In this process, central server 2 creates a charge schedule for each home system 4 in accordance with charge start time based on the arrival time of the electric vehicle at home and the amount of charging based on the remaining charge information (step ST2). Charge schedules S4 created by central server 2 are sent to the respective home systems 4.

Upon the receipt of charge schedule S4, each home system 4 causes control panel 43 to display this charge schedule, and sets this charge schedule in charging station 44. Thus, a reservation is made to start charging in charging station 44 at the charge start time specified in the charge schedule. After setting the charge schedule, home system 4 obtains a charge history record of charging station 44, and sends charge history record notice S5 to central server 2 at time intervals of a predetermined length.

Central server 2 receives upper power limit notice S1 from electric power company's server 3, coming-home notice S2 and travel information S3 from on-board device 1, and charge history record notice S5 from home system 4. Central server 2 causes demand forecast unit 21 to perform demand forecasting for each power management area based on coming-home notice S2 and travel information S3. Central server 2 checks a power demand in each power management area obtained by demand forecasting against the upper power limit for the power management area to determine whether or not charge schedules need to be changed (step ST4).

In this process, central server 2 causes charge schedule management unit 22 to obtain a power consumption in the power management area through electric power company's server 3. Central server 2 compares the obtained power consumption and the demanded power in the power management area forecasted by demand forecast unit 21 to calculate a degree of match. For example, there are cases where the arrival time of the electric vehicle at home varies due to a traffic jam or user's circumstances. In such cases, the power demand forecast is wrong which indicates that charging is performed in home system 4 based on the remaining charge information and the travel information contained in coming-home notice S2.

Accordingly, in the case where the degree of match evaluated by charge schedule management unit 22 is lower than a predetermined value, demand forecast unit 21 re-forecasts demanded power in the power management area based on coming-home notice S2 and travel information S3. Then, based on the demanded power as a re-forecast result of demand forecast unit 21, charge schedule management unit 22 issues a charge schedule change request to charging stations 44 included in the power management area. This charge schedule change request is sent to home systems 4 as charge schedule notice S6.

Moreover, in home system 4, charge schedule management unit 22 desirably learns the process of generating a charge schedule change request in each power management area based on the degree of match. For example, in the case of a user whose time of arrival at home is late, the charge schedule is shifted to a later time. Further, there is a power management area where a traffic jam tends to occur due to heavy traffic. In such power management area, charge start time is later. Accordingly, charge schedule management unit 22 can adjust time of arrival at home by learning a charging pattern in each power management area. Furthermore, in order to forecast a power demand in each power management area, central server 2 desirably registers electric vehicles going on long trips. This learning of the charge schedule generation process enables a high-precision charge schedule to be planed.

Thus, charge schedule management unit 22 changes charge start time, charge rate, charge duration, and the like for each home system 4 to lower or shift (move) a peak power demand in each power management area.

Upon the receipt of charge schedule notice S6, home system 4 causes control panel 43 to issue an alarm by a visible or audible indication or the like. Moreover, home system 4 changes the charge schedule set in step ST3 (step ST6).

After that, when home system 4 determines that it is the charge start time (step ST7), home system 4 provides control signal S7 to charging station 44. In response to this control signal S7, charging station 44 starts charging (step ST8). In response to the start of charging by charging station 44, home system 4 provides charge history record notice S8 to central server 2.

Upon the receipt of charge history record notice S8 from home system 4, central server 2 stores the charge history record (step ST9).

As described above, in this charging system, the coming-home notice sent from on-board device 1 contains the remaining charge of the rechargeable battery. This enables central server 2 to forecast a power demand created by charging of the electric vehicle using home system 4 and forecast a power demand required for charging of electric vehicles for each power management area. Thus, with this charging system, a charge schedule change request to keep the power demand in the power management area from exceeding the upper power limit for the power management area can be sent to home systems 4. For example, notice of shifting of the time slot for charging the electric vehicles can be issued to the users of home systems 4. This enables this charging system to avoid charging the electric vehicles at the same time in the time slot in which the electric vehicles arrive at home.

Moreover, in the charging system, in the case where the actual power consumption in the power management area does not match the demanded power forecasted by demand forecast unit 21, a power demand in the power management area can be re-forecasted. Further, based on the demanded power as a re-forecast result of demand forecast unit 21, a charge schedule change request can be issued to charging stations 44 contained in the power management area. Accordingly, in the charging system, in the case where demand forecasting by demand forecast unit 21 is not appropriate and charge schedules need to be changed, home systems 4 can be adjusted to update the charge schedules.

Furthermore, the charging system learns the process of generating a charge schedule change request in a power management area based on the degree of match between the actual power consumption in the power management area and the demanded power forecasted by demand forecast unit 21. Thus, with the charging system, precisions of charge schedules can be improved.

It should be noted that the above-described embodiment is one example of the invention. Accordingly, the invention is not limited to the above-described embodiment. Of course, other than the embodiment, various modifications can be made in accordance with design and the like within the scope of technical ideas of the invention.

For example, in the above-described charging system, by sending a charge schedule change request from central server 2 to home system 4, the operation of charging the rechargeable battery of the electric vehicle is inhibited irrespective of whether the user comes home. Accordingly, this charging system can assist a business model in which by sending a charge history record notice from home system 4 to central server 2, a privilege is granted to home system 4 based on the charge history record notice. The privilege to home system 4 may be, for example, information on a discounted electricity rate. Based on the charge history record notice sent from home system 4, central server 2 determines that the charging operation by home system 4 is changed in accordance with a charge schedule change request. In this case, central server 2 provides information to that effect and an ID of home system 4 to electric power company's server 3. Thus, electric power company's server 3 can charge for electricity to a home corresponding to the ID of home system 4 at a discounted rate.

Japanese Patent Application No. 2011-204900 (filed on Sep. 20, 2011) is hereby incorporated by reference in its entirety.

According to the embodiments above, since information sent from an electric vehicle contains the remaining charge of a rechargeable battery, a server device can forecast a power demand in each predetermined area and manage power for each predetermined area.

A program that realizes a charging system, server device, and program for server device as described above may be stored on a non-transitory computer readable medium. The program stored in the recording medium is read into a system, such as computer, so that the above-described energy management device, energy management system and program can be realized by executing the program while controlling the system. The medium includes such devices as a memory device, magnetic disk device, and an optical disk device, that are able to record the program. For example, the recording medium could be Blu-Ray disk CD-ROM (Compact Disc, read only memory), DVD (Digital Versatile Disc), ZIP disc, JAZ disc, MO (Magneto-optical) disc, DAT (Digital Audio Tape), or the like. A program that realizes a charging system, server device, and program for server device above may be stored on a non-transitory computer readable medium. The program stored in the recording medium is read into a system, such as computer, so that the above-described charging system, server device, and program for server device can be realized by executing the program while controlling the system. The medium includes such devices as a memory device, magnetic disk device, and an optical disk device, that are able to record the program. For example, the recording medium could be Blu-Ray disk CD-ROM (Compact Disc, read only memory), DVD (Digital Versatile Disc), ZIP disc, JAZ disc, MO (Magneto-optical) disc, DAT (Digital Audio Tape), or the like.

The invention claimed is:

1. A charging system comprising:
a server device capable of communicating with an electric vehicle driven by electric power stored in a rechargeable battery; and a charge control device capable of communicating with the server device and configured to control charging of the rechargeable battery,
wherein the server device comprises:
a communication unit configured to receive travel information including a destination on the electric vehicle and remaining charge information on the rechargeable battery of the electric vehicle from the electric vehicle;
a demand forecast unit configured to collect the travel information including the destination and the remaining charge information for a predetermined area based on the travel information including the destination and the remaining charge information received by the communication unit, and forecast demanded power of the predetermined area by estimating a time slot during which the rechargeable battery of the electric vehicle is charged in the predetermined area; and
a schedule management unit configured to issue, a charge schedule change request to request refraining from charging the electric vehicle in a certain time slot, to the charge control device included in the predetermined area for which it is determined that a charge schedule need to be changed by demand forecasting against an upper power limit for the predetermined area, based on the demanded power in the predetermined area forecasted by the demand forecast unit, and
the charge control device changes a charge schedule for the rechargeable battery mounted on the electric vehicle in accordance with the charge schedule change request issued by the server device.

2. A charging system comprising:
a server device capable of communicating with an electric vehicle driven by electric power stored in a rechargeable battery; and a charge control device capable of communicating with the server device and configured to control charging of the rechargeable battery,
wherein the server device comprises: a communication unit configured to receive travel information on the electric vehicle and remaining charge information on the rechargeable battery of the electric vehicle from the electric vehicle; a demand forecast unit configured to forecast demanded power in a predetermined area based on the travel information and the remaining charge information received by the communication unit; and a schedule management unit configured to issue a charge schedule change request to the charge control device included in the predetermined area based on the demanded power in the predetermined area forecasted by the demand forecast unit, and
the charge control device changes a charge schedule for the rechargeable battery mounted on the electric vehicle in accordance with the charge schedule change request issued by the server device,
wherein the schedule management unit obtains a power consumption in the predetermined area, and compares the obtained power consumption and the demanded power in the predetermined area forecasted by the demand forecast unit to calculate a degree of match,
in a case where the degree of match calculated by the schedule management unit is lower than a predetermined value, the demand forecast unit re-forecasts demanded power in the predetermined area based on the travel information and the remaining charge information, and
the schedule management unit issues a charge schedule change request to the charge control device included in the predetermined area based on the demanded power as a re-forecast result of the demand forecast unit.

3. The charging system according to claim 2, wherein the schedule management unit learns a process of generating the charge schedule change request in the predetermined area based on the degree of match.

4. A server device capable of communicating with an electric vehicle driven by electric power stored in a rechargeable battery and a charge control device configured to control charging of the rechargeable battery mounted on the electric vehicle, the server device comprising:
a communication unit configured to receive travel information including a destination on the electric vehicle and remaining charge information on the rechargeable battery of the electric vehicle from the electric vehicle;

a demand forecast unit configured to collect the travel information including the destination and the remaining charge information for a predetermined area based on the travel information including a destination and the remaining charge information received by the communication unit, and forecast demanded power of the predetermined area by estimating a time slot during which the rechargeable battery of the electric vehicle is charged in the predetermined area; and a schedule management unit configured to issue, a charge schedule change request to request refraining from charging the electric vehicle in a certain time slot, to the charge control device included in the predetermined area for which it is determined that a charge schedule need to be changed by demand forecasting against an upper power limit for the predetermined area, based on the demanded power in the predetermined area forecasted by the demand forecast unit.

5. A non-transitory computer readable storage medium storing a program for a server device capable of communicating with an electric vehicle driven by electric power stored in a rechargeable battery and a charge control device configured to control charging of the rechargeable battery mounted on the electric vehicle, the program causing a computer of the server device to function as:

a communication unit configured to receive travel information including a destination on the electric vehicle and remaining charge information on the rechargeable battery of the electric vehicle from the electric vehicle;

a demand forecast unit configured to collect the travel information including the destination and the remaining charge information for a predetermined area including a destination contained in the travel information based on the travel information and the remaining charge information received by the communication unit; and a schedule management unit configured to issue, a charge schedule change request to request refraining from charging the electric vehicle in a certain time slot, to the charge control device included in the predetermined area for which it is determined that a charge schedule need to be changed by demand forecasting against an upper power limit for the predetermined area, based on the demanded power in the predetermined area forecasted by the demand forecast unit.

6. A server device capable of communicating with an electric vehicle driven by electric power stored in a rechargeable battery and a charge control device configured to control charging of the rechargeable battery mounted on the electric vehicle, the server device comprising:

a communication unit configured to receive travel information on the electric vehicle and remaining charge information on the rechargeable battery of the electric vehicle from the electric vehicle;

a demand forecast unit configured to forecast demanded power in a predetermined area based on the travel information and the remaining charge information received by the communication unit; and a schedule management unit configured to issue a charge schedule change request to the charge control device included in the predetermined area based on the demanded power in the predetermined area forecasted by the demand forecast unit, wherein the schedule management unit obtains a power consumption in the predetermined area, and compares the obtained power consumption and the demanded power in the predetermined area forecasted by the demand forecast unit to calculate a degree of match, in a case where the degree of match calculated by the schedule management unit is lower than a predetermined value, the demand forecast unit re-forecasts demanded power in the predetermined area based on the travel information and the remaining charge information, and the schedule management unit issues a charge schedule change request to the charge control device included in the predetermined area based on the demanded power as a re-forecast result of the demand forecast unit.

7. The server device according to claim 6, wherein the schedule management unit learns a process of generating the charge schedule change request in the predetermined area based on the degree of match.

8. A non-transitory computer readable storage medium storing a program for a server device capable of communicating with an electric vehicle driven by electric power stored in a rechargeable battery and a charge control device configured to control charging of the rechargeable battery mounted on the electric vehicle, the program causing a computer of the server device to function as:

a communication unit configured to receive travel information on the electric vehicle and remaining charge information on the rechargeable battery of the electric vehicle from the electric vehicle;

a demand forecast unit configured to forecast demanded power in a predetermined area including a destination contained in the travel information based on the travel information and the remaining charge information received by the communication unit; and a schedule management unit configured to issue a charge schedule change request to the charge control device included in the predetermined area based on the demanded power in the predetermined area forecasted by the demand forecast unit, wherein the schedule management unit obtains a power consumption in the predetermined area, and compares the obtained power consumption and the demanded power in the predetermined area forecasted by the demand forecast unit to calculate a degree of match, in a case where the degree of match calculated by the schedule management unit is lower than a predetermined value, the demand forecast unit re-forecasts demanded power in the predetermined area based on the travel information and the remaining charge information, and the schedule management unit issues a charge schedule change request to the charge control device included in the predetermined area based on the demanded power as a re-forecast result of the demand forecast unit.

9. The non-transitory computer readable storage medium storing the program for server device according to claim 8, wherein the schedule management unit learns a process of generating the charge schedule change request in the predetermined area based on the degree of match.

* * * * *